(12) United States Patent
Feng et al.

(10) Patent No.: US 9,254,544 B2
(45) Date of Patent: Feb. 9, 2016

(54) COLLOIDAL SILICA FINISHING OF METAL FLUORIDE OPTICAL COMPONENTS

(75) Inventors: Jiangwei Feng, Painted Post, NY (US); Mai Phung, Rochester, NY (US); Robert Sabia, Corning, NY (US)

(73) Assignee: Corning Incorporated, Corning, NY (US)

( * ) Notice: Subject to any disclaimer, the term of this patent is extended or adjusted under 35 U.S.C. 154(b) by 660 days.

(21) Appl. No.: 12/200,214

(22) Filed: Aug. 28, 2008

(65) Prior Publication Data

US 2010/0055453 A1    Mar. 4, 2010

(51) Int. Cl.
| | |
|---|---|
| *B24B 1/00* | (2006.01) |
| *B24B 7/30* | (2006.01) |
| *G11B 9/00* | (2006.01) |
| *B24B 13/00* | (2006.01) |
| *G02B 1/02* | (2006.01) |
| *G02B 27/00* | (2006.01) |

(52) U.S. Cl.
CPC . *B24B 13/00* (2013.01); *G02B 1/02* (2013.01); *G02B 27/0006* (2013.01); *Y10T 428/268* (2015.01)

(58) Field of Classification Search
CPC .................................................. B24B 37/0056
See application file for complete search history.

(56) References Cited

U.S. PATENT DOCUMENTS

| | | | |
|---|---|---|---|
| 6,248,002 B1 | 6/2001 | Wang et al. | |
| 6,375,551 B1* | 4/2002 | Darcangelo et al. | 451/41 |
| 6,595,834 B2* | 7/2003 | Retherford et al. | 451/41 |
| 7,128,984 B2* | 10/2006 | Maier et al. | 428/696 |
| 7,242,843 B2* | 7/2007 | Clar et al. | 385/147 |
| 2002/0019136 A1* | 2/2002 | Suzuki | 438/694 |
| 2012/0057222 A1* | 3/2012 | Hashimoto et al. | 359/352 |

FOREIGN PATENT DOCUMENTS

| | | |
|---|---|---|
| JP | 2000-308950 | 11/2000 |
| JP | 2002-82211 | 3/2002 |
| JP | 2003-257902 | 9/2003 |

OTHER PUBLICATIONS

Namba et al; "Ultrafind Finishing of Veramics and Metals by Float Polishing"; Laser Induced Damage in Optical Materials: 1980; Proceedings of a Symposium Held at Boulder, CO on Sep. 30-Oct. 1, 1980 p. 171-179.
Namba et al; "Ultra-Precision Float Polishing Machine"; Annuals of the Cirp vol. 36/1/1997; p. 211-214.
Hed et al; "Optical Glass Fabrication Technology. 2: Relationship Between Surface Roughness and Subsurface Damage"; Nov. 1, 1987; vol. 26, No. 21 / Applied Optics; pp. 4677-4680.
Retherford et al; "Effect of Surface Quality on Transmission Performance for (111) CAF2"; Applied Surface Science 183 (2001) 264-269.
Ohnishi et al; "High Resolution Transmission Electron Microscopy Study of Calcium Fluoride Single Crystal (111) Surfaces Processed by Ultraprecision Machining"; Materials Transaction, vol. 47, No. 2 (2006) pp. 267-270.
Machine Translation of JP2000308950.
Machine Translation of JP2002082211.
Machine Translation of JP2003257902.
JP2009-196686 Office Action.

* cited by examiner

Primary Examiner — Sheeba Ahmed
(74) Attorney, Agent, or Firm — John P. Ciccarelli (57) ABSTRACT

The invention is directed to a method for finishing alkaline earth metal fluoride optical components and to the alkaline earth optical elements produced using the method. In particular, in the last polishing step, the method of the invention uses a colloidal silica polishing slurry having containing silica particles having a particle size of <500 nm. Additionally, after colloidal silica polishing, the method using a megasonic cleaning step with a high pH detergent cleaning solution to remove any silica residue on the polished optical component. The optic resulting from use of the method has a polished and unetched surface roughness of less than 0.5 nm; a surface roughness of less then 0.6 nm after polishing and etching; and a step height of less than 6 nm.

4 Claims, 13 Drawing Sheets

COLLOIDAL SILICA FINISHING OF METAL FLUORIDE OPTICAL COMPONENTS

TECHNICAL FIELD

The invention is directed to a method for finishing alkaline earth metal fluoride optical components and to the alkaline earth optical elements produced using the method. Use of the method of the invention produces alkaline earth optical elements that have improved durability and lifetime.

BACKGROUND

The use of high power lasers, for example, those with pulse energy densities (fluence) above 20 mJ/cm², with pulse lengths in the low nanometer range, can degrade the optics used in laser lithography systems. T. M. Stephen et al., in their article "Degradation of Vacuum Exposed $SiO_2$ Laser Windows" SPIE Vol. 1848, pp. 106-110 (1992), report on the surface degradation of fused silica in Ar-ion laser. More recently, it has been noticed that there is optical window surface degradation in high peak and average power 193 nm excimer lasers using window materials made from substances other than silica. There is also evidence that such degradation will be more severe when existing optical materials are used in 157 nm laser systems. While some solutions such as using $MgF_2$ as the window or lens material for existing 193 nm laser systems have been proposed, it is believed that such materials will also experience surface degradation with time, leading to the requirement that the expensive windows be periodically replaced. It is further believed that the problem with window degradation will be exacerbated with the advent of laser systems operating at wavelengths below 193 nm. In addition, the use of $MgF_2$ as a window material, while it might be successful from a mechanical viewpoint, presents a problem of color center formation that is detrimental to transmission performance of the laser beam.

Excimer lasers are the illumination sources of choice for the microlithographic industry. While ionic materials as such as crystals $MgF_2$, $BaF_2$ and $CaF_2$ are the materials of choice for excimer optical components due to their ultraviolet transparencies and to their large band gap energies, the preferred material is $CaF_2$. However, crystals of $CaF_2$ and the optical elements made from $CaF_2$ are difficult to optically polish. Furthermore, polished but uncoated surfaces of $CaF_2$ are susceptible to degradation when exposed to powerful excimer lasers operating in the deep ultraviolet ("DUV") range of less than 250 nm, for example at 248 and 193 nm. For lasers operating at 193 nm, 2 KHz or 4 KHz, with pulse energy densities of 20-40 mJ/cm², the surfaces or the optical elements made from these ionic materials are known to fail after only a few million laser pulses. The cause of the damage is thought to be fluorine depletion in the top surface layers of the polished surface. See Wang et al., "Color center formation on $CaF_2$ (111) surface investigated by using low-energy-plasma-ion surfacing", Optical Society of America 2004, [2004_OSA_OF&T] and Wang et al., "Surface assessment of $CaF_2$ deep-ultraviolet and vacuum-ultraviolet optical components by the quasi-Brewster angle technique," Applied Optics, Vol. 45, No. 22 (August 2006), pages 5621-5628. U.S. Pat. No. 6,466,365 (the '365 patent) describes a method of protecting metal fluoride surfaces, such as $CaF_2$, from degradation by use of a vacuum deposition, of a silicon oxyfluoride coating/material. While for the moment this is a reasonable solution, the microlithographic industry constantly demands more performance from excimer sources, and consequently from optical components used in connection with Excimer laser based systems. Therefore, in view of the expected increased industry demands for improved laser performance, it is desirable to find a solution to the optical element degradation problem that will either eliminate the problem or will greatly extend the durability, and consequently the length of time that existing and future optical components can be used.

SUMMARY

The invention is directed to a method for finishing alkaline earth metal fluoride optical components using a final colloidal silica polishing step and to the alkaline earth optical elements produced using the method. In accordance with the invention, the final polishing step utilizes colloidal silica having a particle size of less than 500 nm (<500 nm) in a high pH solution or slurry to remove any Bielby layer present on an optical element after any initial polishing steps and to further eliminate any surface defects that may be present due to such initial polishing steps. Etching in water after the final colloidal silica polishing produced a finished optical element having a surface roughness of less than 0.5 nm rms.

In one embodiment the invention is directed to a method for polishing DUV optics made of an alkaline earth metal fluoride single crystal, the method having at least the steps of polishing with 1.5 µm diamond grit (i.e., particle size), 0.25 µm diamond grit and colloidal silica having a particle size of <500 nm, and sonically cleaning (ultrasonic or megasonic) the optic after each polishing step. In another embodiment the colloidal silica particle size is less than 200 nm (<200 nm). In a further embodiment the colloidal silica particle size is in the range of 30-200 nm. In an additional embodiment the colloidal silica particle size is in the range of 100-170 nm.

In another embodiment the invention is directed to a method for polishing DUV optics, said method having the steps of providing a DUV optic blank made of an alkaline earth metal fluoride having a first side and a second side for transmission of electromagnetic radiation therethrough; ultrasonically cleaning the optic using a high pH detergent solution followed by a deionized water rinse; polishing both sides of the optic blank using a 1.5 µm diamond grit slurry; ultrasonically cleaning the 1.5 µm diamond grit slurry polished optic using a high pH detergent solution followed by a deionized water rinse; polishing both sides of the optic blank using a 0.25 µm diamond grit slurry; ultrasonically cleaning the 0.25 µm diamond grit slurry polished optic using a high pH detergent solution followed by a deionized water rinse; polishing both sides of the optic blank using a high pH colloidal particle silica slurry; megasonically cleaning the colloidal silica slurry polished optic using a high pH detergent solution followed by a deionized water rinse; and acetone/alcohol wiping both sides of the colloidal silica slurry polished optic. The method utilizes slurry or solution containing colloidal silica of particles size <500 nm. In one embodiment the colloidal silica particle size is less than 200 nm. In a further embodiment the colloidal silica particle size is in the range of 30-200 nm. In an additional embodiment the colloidal silica particle size is in the range of 100-170 nm.

The invention is further directed to an alkaline earth metal fluoride single crystal optic, said optic comprising an single crystal optic made of an alkaline earth metal fluoride selected from the group consisting of $MgF_2$, $CaF_2$, $BaF_2$ and $SrF_2$, and mixtures thereof. The optic has an unetched surface roughness after polishing of less 0.2 nm rms.

DETAILED DESCRIPTION

The method of the invention is generally directed to the polishing of alkaline earth metal fluoride single crystal optical elements (elements made of $MgF_2$, $CaF_2$, $BaF_2$ and $SrF_2$, and mixtures thereof) and is particularly suited to the production of $CaF_2$ optical elements suitable for use in laser systems operating below 200 nm wavelength, for example, 193 nm and 158 nm laser systems. Herein, $CaF_2$ will be used as an exemplary material to illustrate the invention and it is to be understood that the optical elements referred to herein are made from single crystal alkaline earth metal fluoride materials, for example, $CaF_2$ or and mixtures of alkaline earth metal fluorides as recited above.

High purity, DUV-grade calcium fluoride ($CaF_2$) is the most suitable optical material for 193 nm lithographic laser components. The requirements for the $CaF_2$ optics surface are high precision surface finish, low subsurface damage and cleanliness. However, for $CaF_2$ optical elements there does not exist a combined chemical-mechanical polishing solution such as the cerium oxide polishing solutions that are used for polishing glass optical elements, for example, those made of fused silica. Instead, mechanical polishing has been the industry standard to-date for, for example, $CaF_2$ optics. However, mechanical polishing is a difficult procedure for single crystal $CaF_2$ optical elements because the material is soft and has a relatively high thermal expansion coefficient.

At the present time diamond slurries utilizing decreasing diamond particle size polishing steps are used in production for the polishing of $CaF_2$ optical elements. As an example, the optical elements can be polished in a plurality of steps using diamond particle sizes of 1.5, 1.0, 0.5 and 0.25 μm. The diamond particles in the slurry are very hard and their reaction with the $CaF_2$ surface is negligible, which leads to the fact that the presently used production methods of polishing are mainly driven by mechanical abrasion that can induce significant subsurface damage. Subsurface damage (SSD) is manifested as fractures and scratches generated during the polishing process. These fractures and scratches can become partially or totally covered by a polishing redeposition layer (a Bielby layer), which is a thin layer of materials that flows while the surface being worked as has been described by Hed et al, "Optical Glass Fabrication Technology. "The relationship between surface roughness and subsurface damage", Applied Optics, Vol. 26, No. 21, pages 4677-4680. U.S. Pat. No. 7,128,984 (Corning Incorporated) also describes the similar re-deposition of various contaminants to form a precipitate layer called a quasi-Bielby layer. This precipitate layer of material contains polishing compound, for example, slurry residue and $CaF_2$ material removed during polishing, that can incorporated into the surface layer or deposited into fractures and scratches. However, this deposited material presents a severe problem during use in high powered laser systems, particularly regarding durability. The SSD reduces laser damage thresholds by reducing fracture strength, providing sites for light-absorbing contaminants to hide, causing atoms at or near fracture surfaces to be easily ionizable, or locally changing the electromagnetic field. FIG. 1 is an illustration of the subsurface damage generated in an optical element after 0.1 μm diamond polishing and 12 hours soaking in deionized ("DI") water.

Y. Namba et al., Annals Manufacturing Technology, Vol. 53, No. 1 (2004), page 459 et seq., used float polishing with 7 nm diameter $SiO_2$ slurry to achieve low subsurface damage $CaF_2$ surface, the polished surface roughness is 7.7 Å (0.77 nm) rms, and TEM cross-section image revealed that there is no crack in $CaF_2$ lattice. R. Sabia et al. [Applied Surface Science, Vol. 183, No. 3-4 (Nov. 28, 2001), page 264 et seq., and U.S. Pat. No. 6,595,834] investigated colloidal silica polishing of $CaF_2$ surfaces and find that this chemical mechanical polishing method results in enhanced optical transmittance of 92%, as compared with 90.3% of diamond slurry polished surface. Commonly owned U.S. application Ser. No. 12/180,849, filed Jul. 28, 2008, in the name of inventors C. Hayden, J. Feng, J. et al., titled "Cleaning Method for DUV Optical Elements to Extend Their Lifetime," developed a systematic cleaning process that enables diamond slurry polished $CaF_2$ lenses to survive one billion pulses of high fluence (120 mJ/cm$^2$, below 200 nm laser radiation in an accelerated laser damage test. The method described herein further extends the lifetime of an alkaline earth metal fluoride ("AEMF") DUV optic, for example, a $CaF_2$ optic, by eliminating or substantially eliminating subsurface scratches and fractures that arise during polishing of the DUV optic and further extends the lifetime of AEMF DUV optics enabling them to survive over two billion pulses of high fluence, below 200 nm laser radiation.

Table 1 one is a comparison of the method of cleaning and polishing an optic according to the present invention and the method of the prior art. As can be seen from Table 1, in the present invention:

after the 0.25 μ diamond polishing and acetone/alcohol wiping (Items 6 and 7), incorporates an ultrasonic ("US") cleaning step (Item 8) which is not used in the prior art;

uses a colloidal silica polishing step (Item 11) instead of the prior art's 0.1 μm diamond polishing (Item 10); and incorporates a megasonic ("MS") cleaning step after the colloidal silica polishing (item 12).

This combination of steps that are not present in the prior art method results in a polished optic that has lower roughness and better performance than optics produced by the prior art.

TABLE 1

Comparison of the Prior Art and an Embodiment of the Invention

| | Prior Art | Embodiment of The Invention |
|---|---|---|
| 1 | Provide optic | Provide optic |
| 2 | US detergent clean + DI rinse | US detergent clean + DI rinse |
| 3 | Polish both sides, 1.5 µm diamond grit | Polish both sides, 1.5 µm diamond grit |
| 4 | US detergent clean + DI rinse | US detergent clean + DI rinse |
| 5 | Visual inspection: flatness + wedge check | Visual inspection: flatness + wedge check |
| 6 | Polish both sides, 0.25 µm diamond grit | Polish both sides, 0.25 µm diamond grit |
| 7 | Wipe with acetone/alcohol mixture | Wipe with acetone/alcohol mixture |
| 8 | --- | US or MS detergent clean + DI rinse |
| 9 | Visual inspection: flatness + wedge check | Visual inspection: flatness + wedge check |
| 10 | Super polish both sides, 0.1 µm diamond grit | --- |
| 11 | --- | Polish both sides, colloidal $SiO_2$ |
| 12 | --- | MS (only) detergent clean + DI rinse |
| 13 | Acetone wipe | Acetone wipe |
| 14 | Visual inspection: flatness + wedge check | Visual inspection: flatness + wedge check |

US clean = Ultrasonic cleaning
MS clean = Megasonic cleaning
DI rinse = Deionized water rinse
Detergent cleaning done at pH ≥ 9.5, preferably pH > 10.
Alcohol = $C_2$ or $C_3$ alcohol
1.5 µm diamond grit polishing is carried out for approximately 15-20 minutes on each side.
0.25 µm diamond grit polishing is carried out for approximately 1 hour on each side.
µm diamond grit polishing is carried out for approximately 24 hours on each side.
Colloidal silica particle size is <500 nm, preferably ≤200 nm.
Colloidal silica polishing is carried out for a time in the range of 8-14 hours on each side.

In contrast to the prior art method of complete diamond slurry polishing, which is mainly driven by mechanical abrasion, colloidal silica polishing is chemical-mechanical polishing driven method. In comparison to diamond particles which are very hard, colloidal silica particles are soft and spherical, with no sharp edges to gouge the surface being polished. Furthermore, colloidal silica particles can be acquired in a tight size distribution range. When colloidal silica particles are used in high pH aqueous slurries, the fluent reacts with the surface to form a soft, hydration layer that allows the particles to mechanically abrade without generating high spatial frequency scratches or subsurface damage. Also potentially impacting polishing with high pH colloidal silica slurries is the formation of silica gel-type soft compounds, which is believed to further mitigate the formation of scratches and sleeks.

The prior art cleaning process is relatively conservative. Ultrasonic cleaning with detergent is used only after 1.5 µm diamond polishing. Cleaning after 0.25 µm diamond polishing and 0.1 µm diamond super polishing is limited to solvent soaking and wiping due to the concerns about cosmetic degradation. In contrast to the prior art, it has been found that high pH detergent ultrasonic/megasonic cleaning after each polishing step, i.e., 1.5 µm diamond, 0.25 µm diamond and colloidal silica polishing, does not compromise surface cosmetics, but is very necessary to reduce subsurface damage occurrence. After final colloidal silica polishing step, cleaning with high pH detergent in megasonic cleaning bath followed by DI megasonic rinsing significantly removes polishing residue and generate a clean surface that has a very low particle count. In a preferred embodiment of the invention megasonic cleaning is used for all cleaning steps because it has significantly less impact in the surface. Using ultrasonic frequencies, cavitations on the order of 2 microns or greater can be produced (at 40 kHz the bubble size can be on the order of 8-10 microns) resulting in an aggressive process as the cavitation bubbles burst upon impact with the substrate surface. Due to the violent bubble collapse as it impacts an optical surface during ultrasonic cleaning, surface damage such as pitting and roughening of the surface is common.

Megasonic cleaning methods produce smaller cavitation sizes (at 800 kHz this is on the order of 800 nm) and is more gentle process than ultrasonic cleaning. Examples of the technical literature on megasonic cleaning are G. Gale et al., *How to Accomplish Effective Megasonic Particle Removal*, Semiconductor International, August 1996, pages 133-138, and Gale et al. *Roles of Cavitation and Acoustic Streaming in Megasonic Cleaning*, Particulate Science and Technology, Vol. 17 (1999), pages 229-238.

In an further embodiment the invention has an optional final "kiss polishing" step that utilizes a soft chemical-mechanical polishing pad (a "CMP" pad; commercially available from, for example, Rohm & Haas Company, Philadelphia, Pa., or Eminess Technologies, Tempe Ariz.) that does not have a polishing pitch thereon and is used with colloidal silica as described herein. Example of such soft pads are polyurethane pads or pads equivalent in chemical and abrasive action.

Figure 1A:
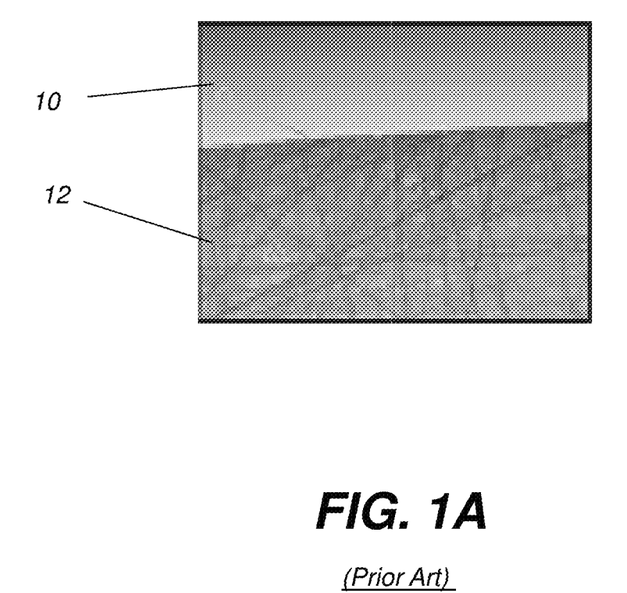
FIG. 1A is an interferometer view of the precipitated layer and the subsurface damage generated after 0.1 µm diamond polishing according to the prior art.
Figure 1B:
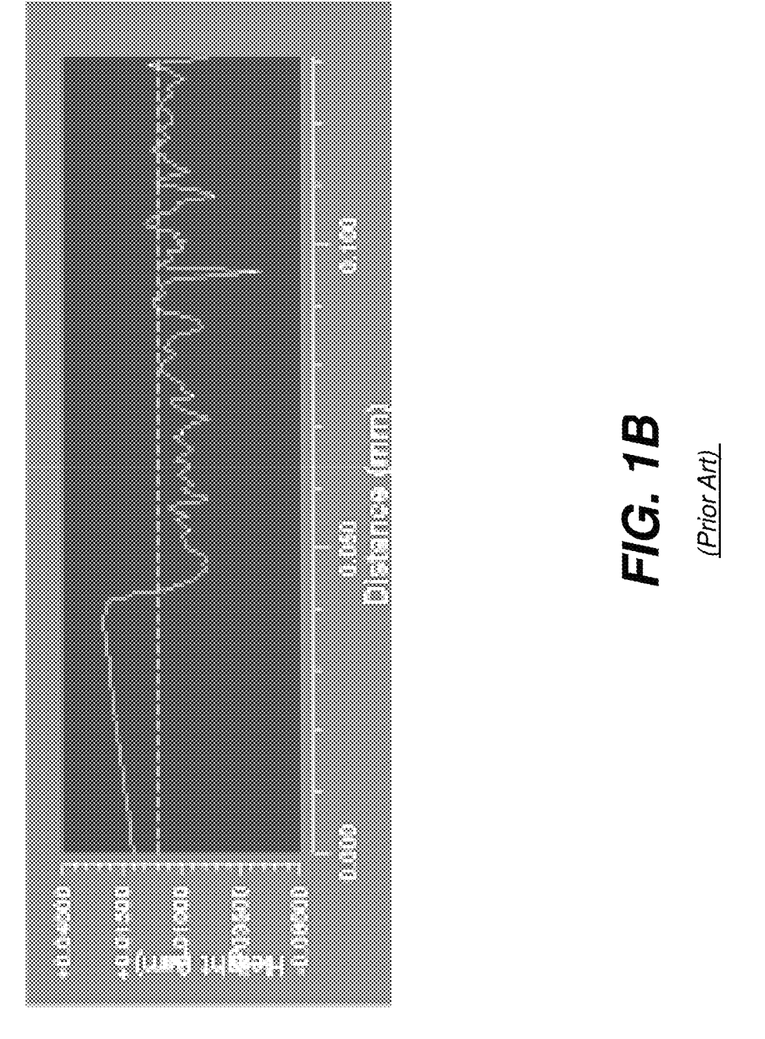
FIG. 1B is illustrates the surface roughness of the precipitated layer (above dashed line) and the subsurface damage (below dashed line) generated after 0.1 μm diamond polishing according to the prior art.

FIGS. 1A and 1B represent a $CaF_2$ optic that was polished using the method of the prior art and were taken using a ZYGO NEWVIEW™ interferometer (Zygo Corporation, Middlefield, Conn.). FIG. 1A illustrates the precipitated layer 10 and subsurface ("SSD") damage 12 that are present on the optic after polishing using the prior art method as described in Table 1. [In FIG. 1A the precipitated layer (the Bielby layer) is indicated by the bracket leading to numeral 10 and includes both the light and dark area within the bracket. The dark area is induced by the uneven surface level of the image as shown in FIG. 1B and is believed due to differences in light reflection.] FIG. 1B shows the surface roughness after polishing (that is, the roughness of the precipitated layer after the final acetone/alcohol wipe) and the roughness of the revealed SSD. The roughness of the precipitated layer is 0.2 nm rms and the roughness of the revealed SSD is 4.2 nm rms.

Figure 2:
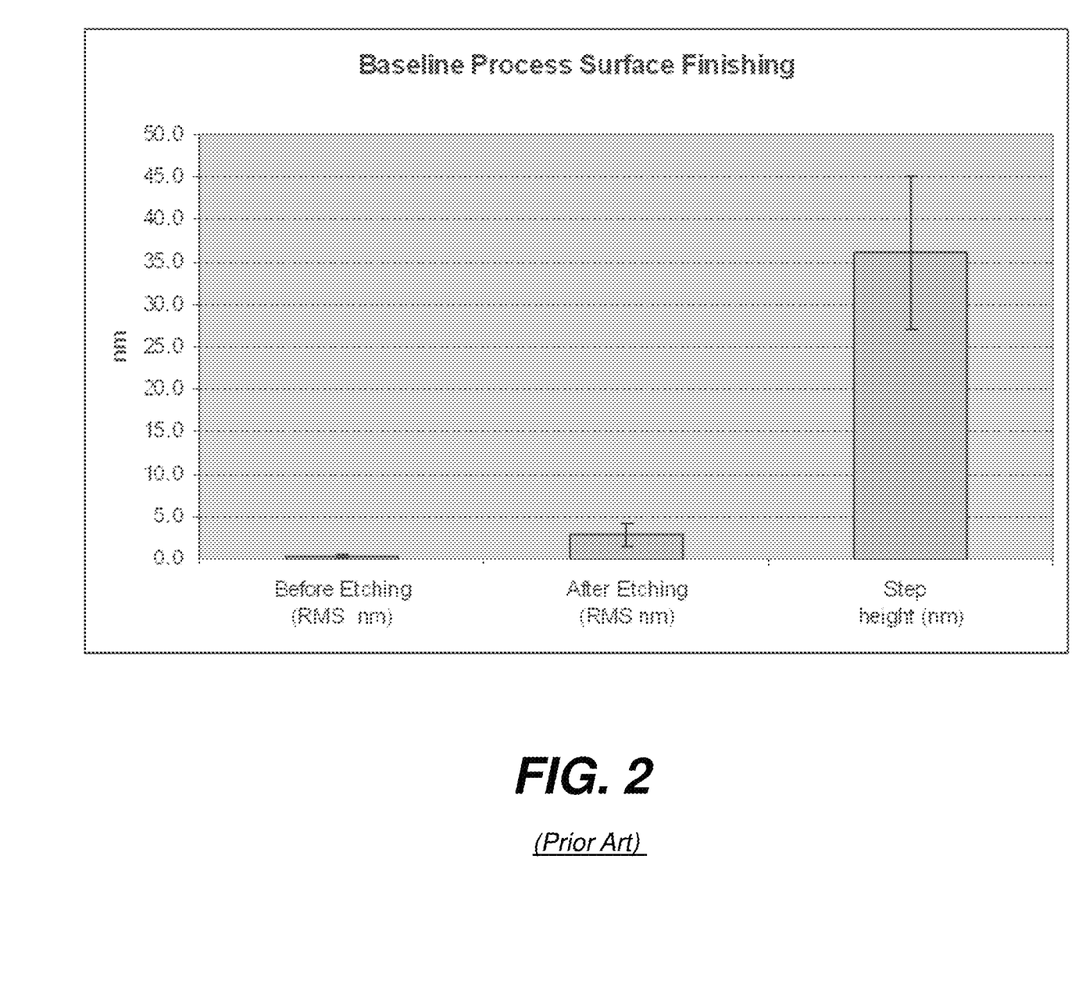
FIG. 2 is a bar chart showing the roughness and step height of optics finished according to the prior art.

FIG. 2 is a bar graph representing a plurality of optics that were finished according to the prior art as described in Table 1. As shown in FIG. 2, the roughness of the surface before etching (that is, the roughness of the precipitated Bielby layer that is present after polishing) is ~0.2 nm rms. However, after etching surface roughness degrades to a value in the range of 2.0-4.0 nm, an order of magnitude increase. Step height is in the range of 25-45 nm, the average being 36 nm as illustrated in FIG. 2.

Figure 3:
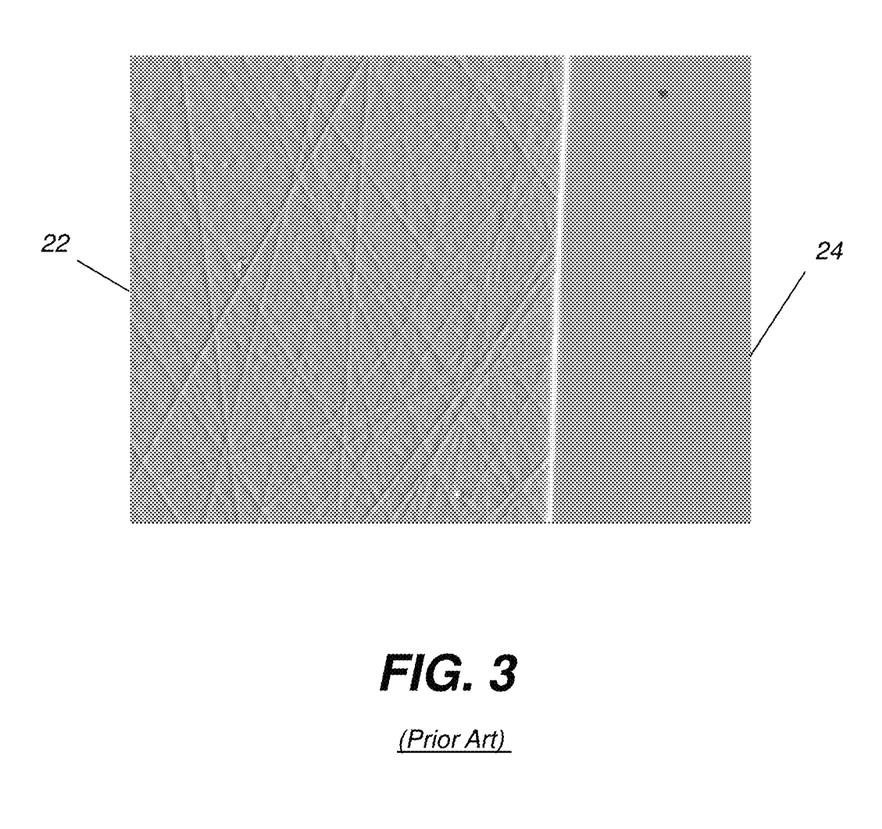
FIG. 3 is a ZYGO NEWVIEW image showing the roughness of etched and unetched surfaces finished according to the prior art.

FIG. 3 represent a single, representative optic polished and cleaned according to the prior are as described in Table 1. A portion of the surface was etched in order to determine the "step height" which is related to the Bielby layer and is roughly the difference between the top of the Bielby and the etched surface. After etching, which removed the precipitated surface layer 24 to reveal the SSD 22, the roughness of the etched surface is ~4.2 nm rms in contrast to unetched surface which had a roughness of 0.2 nm rms as mentioned above. The "step height", which is the difference between the top of the precipitated Bielby layer and the surface after etching is approximately 35 nm. The etching not only removes the precipitated Bielby layer, but also can remove a portion of the $CaF_2$ material itself. Hence the step height, measured as described above, can be greater than the Bielby layer. While etching was carried out using DI water, acidic solutions can also be used as an etchants. Examples of such acid solutions include, without limitation, 0.1M solutions of HCl, $HNO_3$, $H_2SO_4$, $H_3PO_4$ and citric acid. As can be seen from FIG. 3, the diamond polishing results in SSD which are only revealed after the optic has been etched. Etching time depends on a number of parameters including the temperature of the etching solution and the pH. For DI water (pH=7) the etching is typically done at room temperature, approximately 18-25° C., for a time in the range of 8-15 hours, typically 12 hours. When acidic solution solutions are used and/or the temperature is increased (for example, to a temperature in the range of >25° C. to approximately 60° C.) the etching time can be lowered, for example to 5 minutes to 4 hours, depending on the acid concentration and temperature of the acid solution.

Using the method of the invention produces an optic that has much thinner precipitated surface layer and subsurface defects as illustrated in FIGS. 1 and 3. As indicated above, the method of the invention includes a colloidal silica polishing step followed by a megasonic cleaning step. The colloidal silica used in accordance with the invention has a particle size in the range of 100-170 nm. The colloidal silica polishing was carried out using commercially available optical polishing pitches suitable for use with alumina or ceria such as those available from CYCAD Products, Las Vegas, N.Mex. or Zophar Mills, North Amityville, N.Y.

Figure 4:
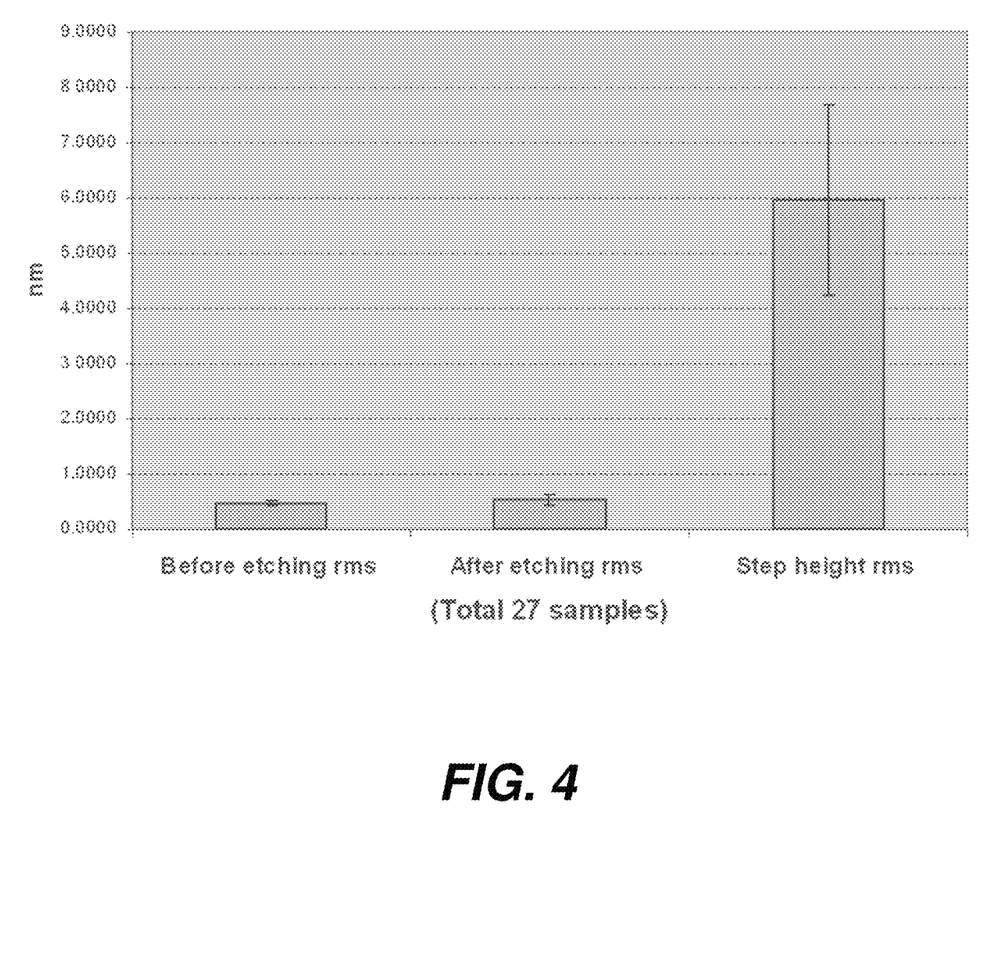
FIG. 4 is a bar chart showing the roughness and step height of optics finished using colloidal silica according to the invention.

FIG. 4 represents a total of twenty-seven (27) optics that were cleaned and polished according to the invention using 150-170 nm silica on a CYCAD pitch for 12-15 hours. This resulted in an optic having significantly less subsurface damage and a good surface finish. A portion of the surface of each optic was then etched using DI water for the same time as the prior art optics represented by FIGS. 1-3. The average results shown in FIG. 4 indicate that using the method of the invention there is relatively little difference between the surface roughness of the etched and unetched portion of the optics. The polished surface roughness is less than 0.5 nm and after water etching the increase in surface roughness is less than 0.1 nm which indicates that there is low subsurface damage. The step height is less than 6 nm which is significantly lower then the step height of the prior art processed optics which have a step being in the range of 20-45 nm, with an average of approximately 35 nm The optics represented by FIG. 4 are substantially free of a precipitated Bielby layer after the final sonic cleaning step which is preferably a megasonic cleaning step. Some Bielby layer may be present, though it is typically significantly thinner than that present when the prior art method is used.

Figure 5:
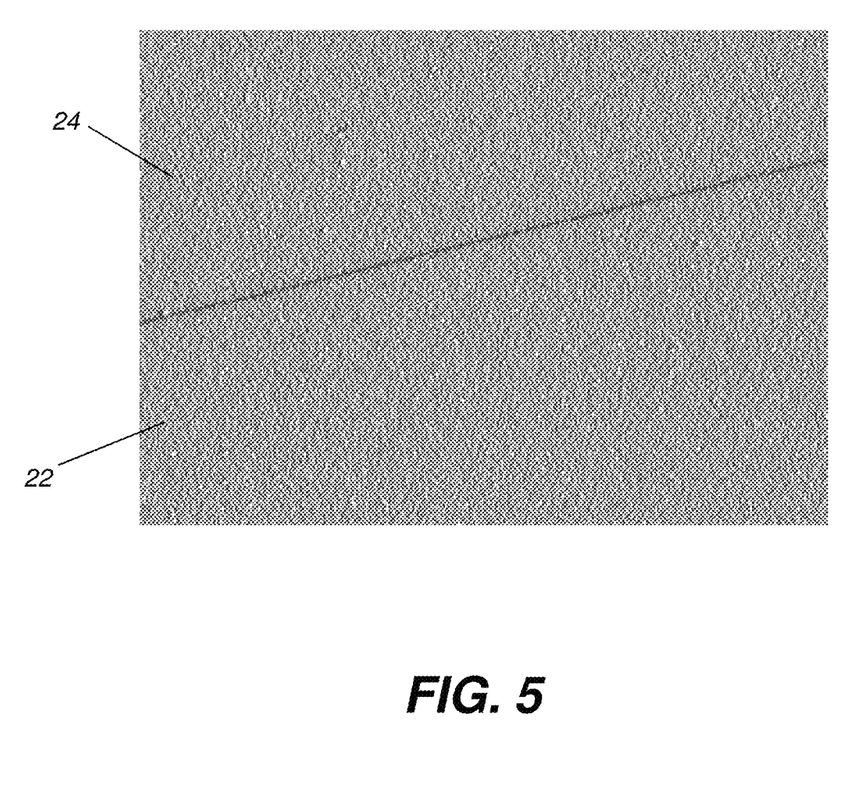
FIG. 5 is a ZYGO NEWVIEW image showing the roughness of etched and unetched surfaces finished according to the invention.

FIG. 5 is a ZYGO NEWVIEW image of the etched 22 and unetched 24 surfaces of a colloidal silica polished $CaF_2$ surface. The etching was carried out for 12 hours using DI water. The polished and unetched area 24 has a roughness of 0.42 nm rms and the etched area 22 has a roughness of 0.426 nm rms. The step height is 4 nm which represents a 9-fold reduction over the over the average step height of 35 nm for prior art optics.

Figure 6:
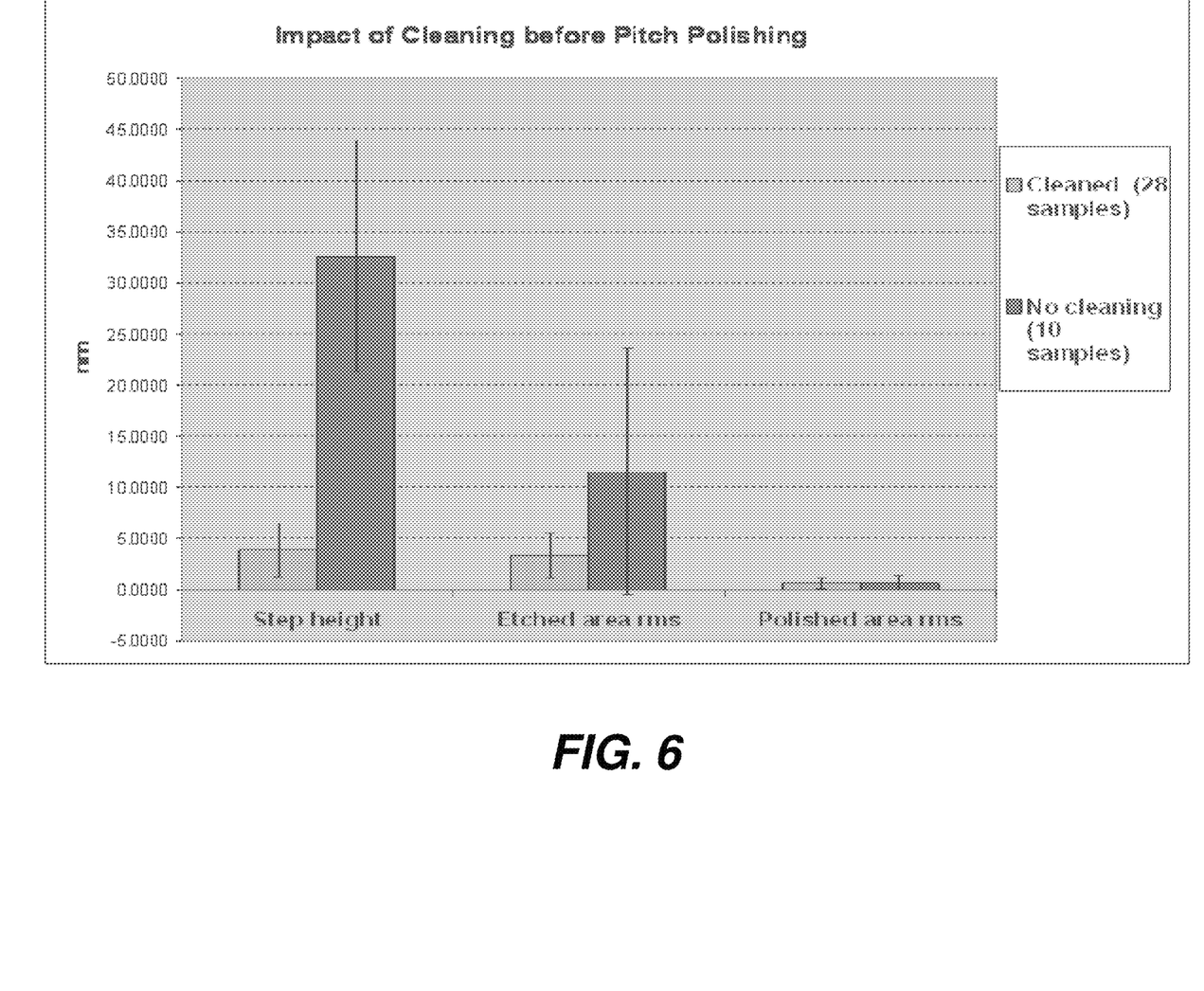
FIG. 6 is a bar chart illustrating the impact of cleaning before pitch polishing using the method of the invention.

FIG. 6 illustrates the impact of ultrasonic or megasonic cleaning (megasonic being preferred) cleaning step after 0.25 µm diamond polishing and before pitch polishing (using either with 0.1 µm or 100-170 nm colloidal silica) on subsurface damage as exemplified by step height and etched area roughness. This additional step is Item 8 in Table 1.

The results shown in FIG. 6 illustrate that cleaning after the 0.25 µm polishing step results in a 66-75% reduction in step height and an approximately 60% etched area roughness when the cleaning step is used. The fact that there is no significant difference between the cleaned and uncleaned polished samples (rightmost set of bars) indicates that simply wiping with solvent after 0.25 µm diamond polishing can not efficiently remove the 0.25 µm diamond polishing slurry, and that 0.25 µm diamond particles still remain on the $CaF_2$ surface during 0.1 µm diamond pitch polishing generating excessive scratches and subsurface damage. This is easily understood by visualizing larger particles being pressed into and forced along a surface, where the applied pressure is not uniformly distributed among all polishing particles due to the gradient in size. The larger 0.25 µm particles can cause deeper indentations than 0.1 µm particles, thus leading to deeper scratches and generating deeper subsurface damage as manifested by deeper etching step height and higher etched area RMS roughness for the samples that were not megasonically or ultrasonically cleaned. It is thus clear that it is necessary to have a cleaning step after 0.25 µm diamond slurry polishing to remove the 0.25 µm particles prior to finishing using colloidal silica.

Figure 7A:
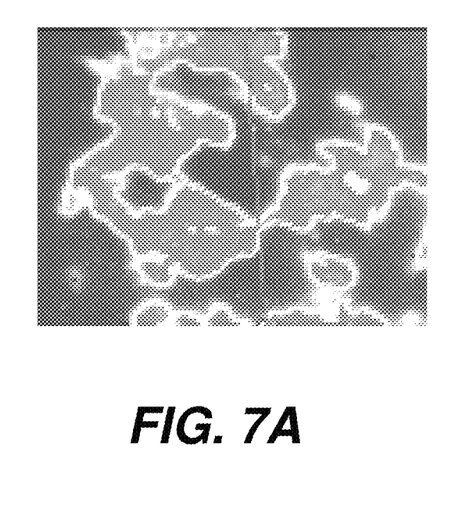
FIG. 7A-7C are ZYGO NEWVIEW images showing caked colloidal silica on the surface of an optic; 7A being a top view, 7B being a 3-D view and 7C being an optical top view.
Figure 7B:
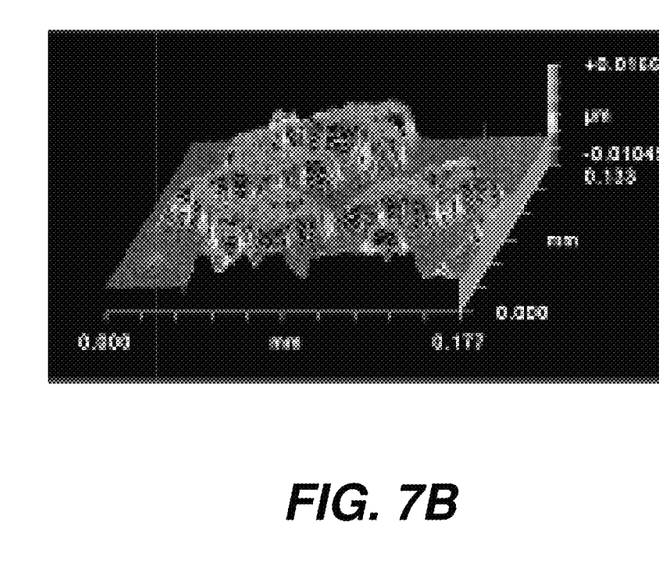
Figure 7C:
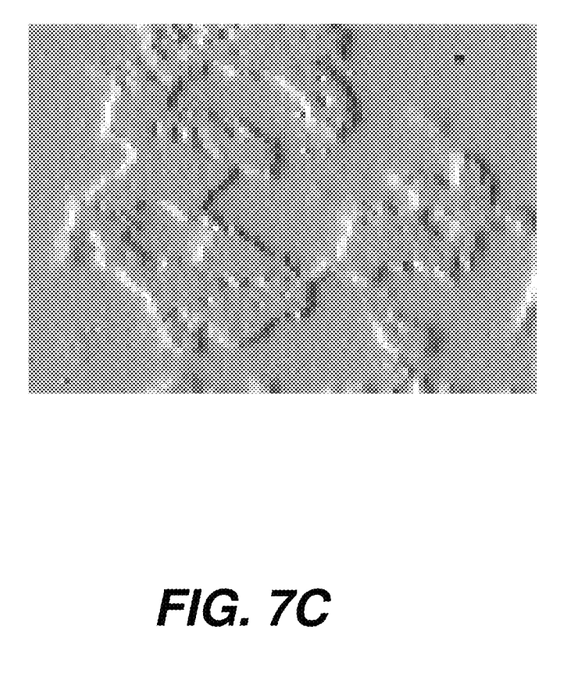
Figure 8:
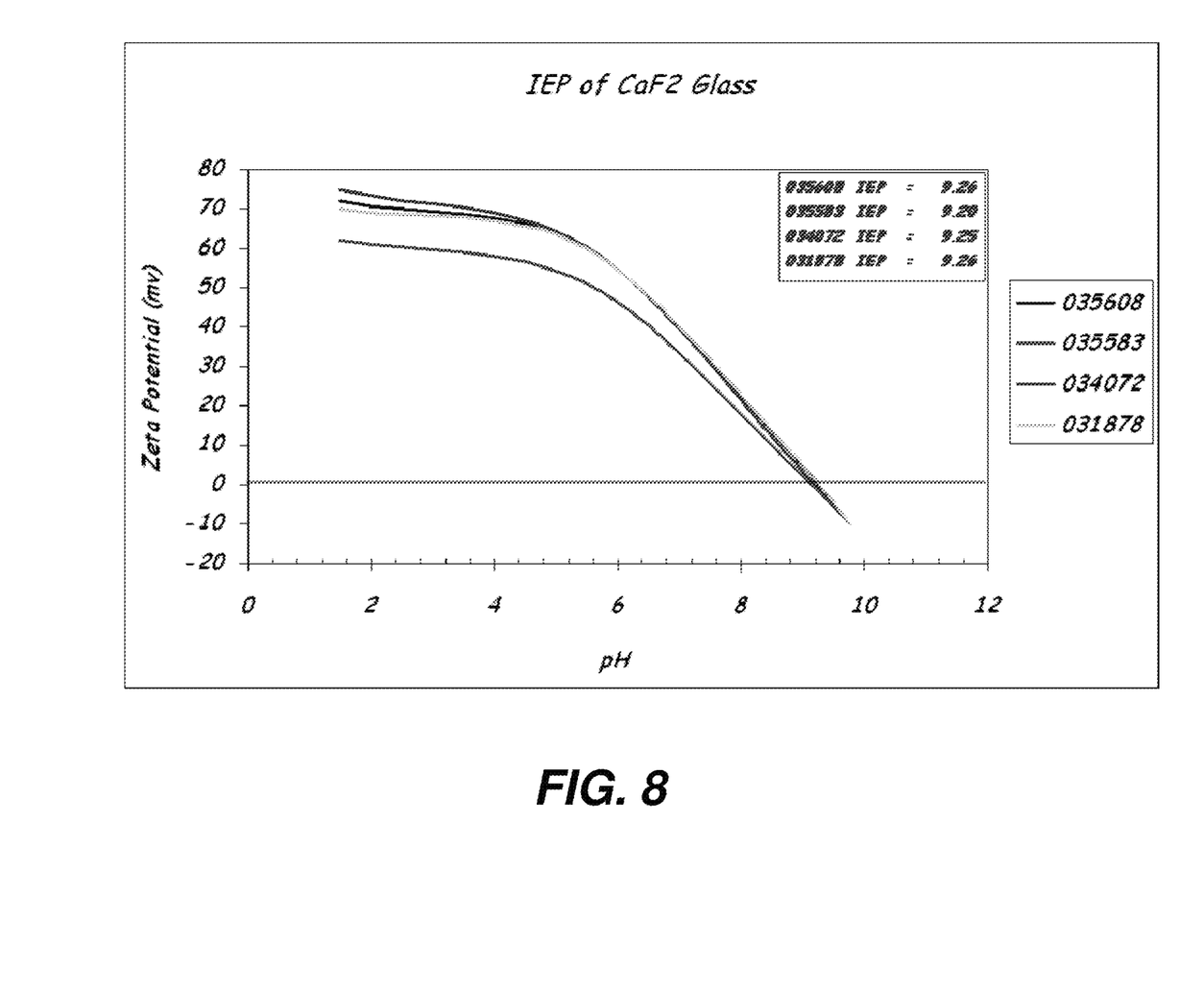
FIG. 8 is a graph of $CaF_2$ zeta potential versus pH.
Figure 9:
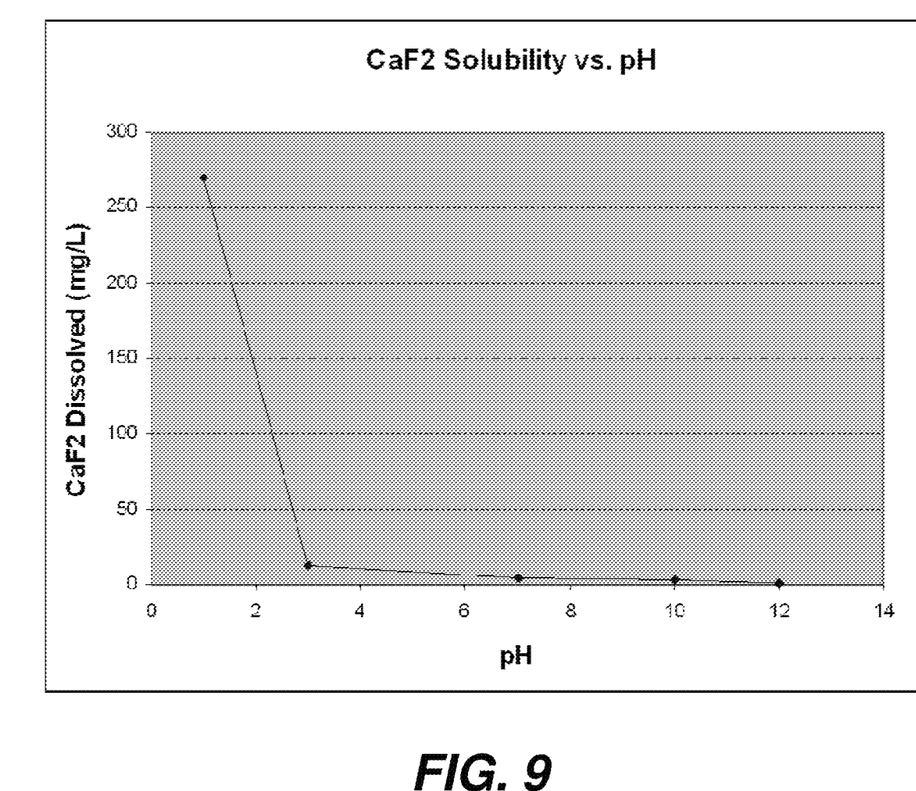
FIG. 9 is a chart illustrating the solubility of $CaF_2$ vs. pH.

Final cleaning after colloidal silica polishing is also critical due to the fact that colloidal silica slurry is notoriously difficult to clean once it has dried on a polished surface. FIG. 7 is a ZYGO NEWVIEW image that shows dried colloidal silica slurry forming patches or islands that can't be removed during cleaning. Silica particle IEP (isoelectric point) is between pH2~3.5. For $CaF_2$ particles the IEP, as shown in FIG. 8, is pH9.26 as measured by zeta potential due to the difficulty in obtaining streaming potential measurement of $CaF_2$ surfaces. To generate repellant forces between silica particles and $CaF_2$ surface during cleaning it is thus necessary to use a slurry whose pH is above 9.26. Consequently, in an embodiment of the invention the final megasonic cleaning (Item 12 in Table 1) is carried out at a pH greater than 9.5 and preferably at a pH greater than 10. A pH higher than 10 will more effectively dissolve residual silica left on a $CaF_2$ surface after polishing and thus enhance cleaning efficiency. In addition, the higher the pH the lower the solubility of $CaF_2$ as shown in FIG. 9; which implies that there is less etching of a $CaF_2$ surface at pH 11-12 is less than there is when of DI water (pH=7) is used as the etchant. As a result, when high pH detergent cleaning is used as the final cleaning step there is less of an undercutting effect due to etching by the cleaning solution than is the case when DI water is used and there is the additional benefit of minimizing surface roughness degradation. An example of a commercially available detergent that can be used in practicing the invention is SEMICLEAN KG detergent (Yokohama-Yushi-Kogyo) which is frequently used for glass and optics cleaning and has pH in the range of 11-13. The formulated detergent has chelating agent that removes metal ions and dust, and a surfactant to remove some organic residue. Other high pH cleaning solutions such as SC1 (a mixture of hydrogen peroxide, ammonia and DI water) or $NH_4OH$ solution alone can also be used as cleaning solutions.

Figure 10A:
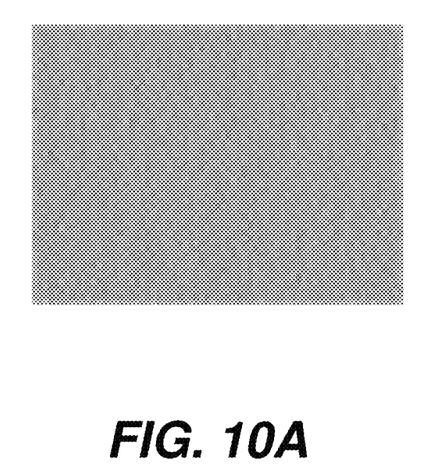
FIGS. 10A and 10B are ZYGO NEWVIEW images of an optic polished according to the invention.
Figure 10B:
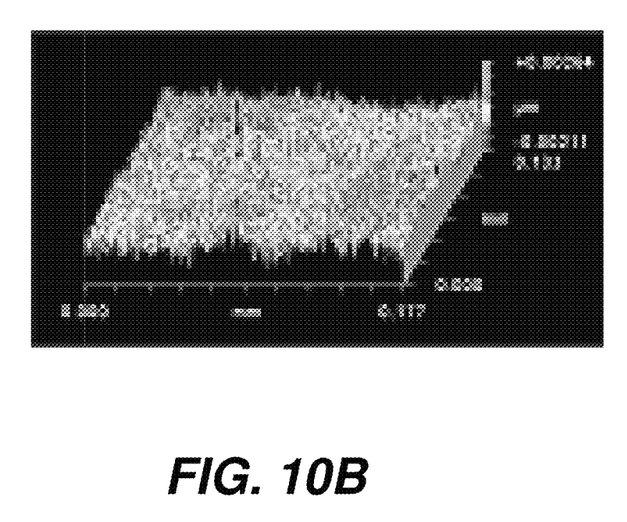
Figure 11:
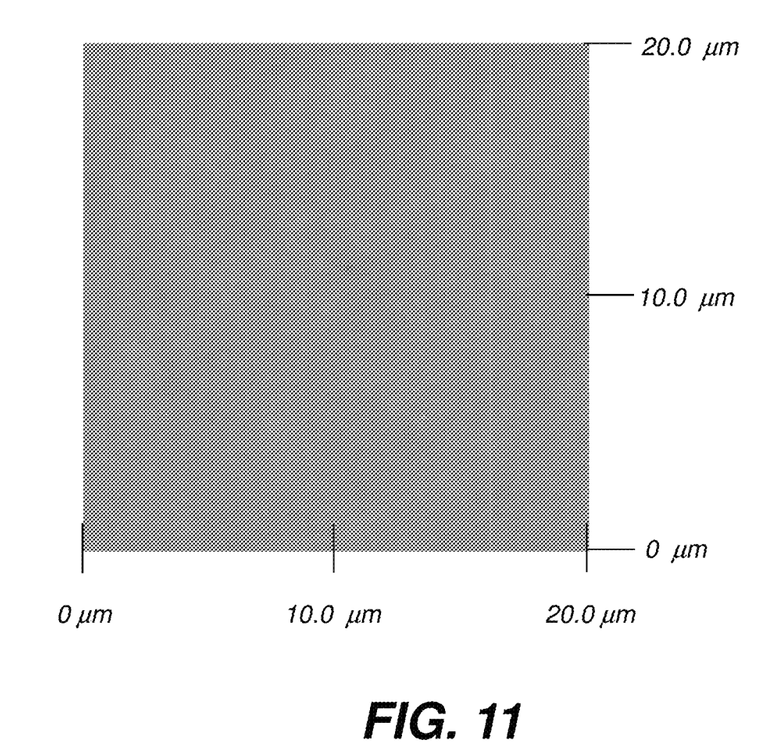
FIG. 11 is an AFM image of an optic surface polished according to the invention.

FIG. 10 is a typical surface after detergent cleaning in which, as can be seen, there are no particles or residue colloidal silica slurry left on the surface. After polishing and cleaning, surface roughness rms is between 0.3 to ~5 nm as shown by the ZYGO NEWVIEW image and the AFM image. After detergent cleaning and DI rinsing, $CaF_2$ samples are gently and carefully wiped by acetone soaked wipes to remove water residue and dry the surface faster. They are then further cleaned using UV/ozone to remove any organic residue. If a protective coating is to be applied, the optics were further cleaned using a very mild oxygen plasma to remove monolayer organic contamination that may have built up during handling. FIG. 11 is an AFM image of the same surface shown in FIG. 10 illustrating the smoothness of the surface.

The present invention has been described in general and in detail by way of examples. Persons skilled in the art understand that the invention is not limited necessarily to the specific embodiments disclosed. Modifications and variations may be made without departing from the scope of the invention as defined by the following claims or their equivalents, including equivalent components presently known, or to be developed, which may be used within the scope of the present invention. Hence, unless changes otherwise depart from the scope of the invention, the changes should be construed as being included herein.

We claim:

1. An alkaline earth metal fluoride single crystal optic, the optic comprising a single crystal optic made of an alkaline earth metal fluoride selected from the group consisting of $MgF_2$, $CaF_2$, $BaF_2$ and $SrF_2$, and mixtures thereof, wherein the optic in an uncoated state comprises a surface roughness of less than 0.6 nm rms, measured using optical interferometry, and is substantially free of a precipitated redeposition layer.

2. The optic according to claim 1, wherein the optic is made of a $CaF_2$ single crystal.

3. The optic according to claim 1, wherein said optic has an etched surface roughness of less than 0.5 nm rms, measured using optical interferometry.

4. The optic according to claim 1, wherein the etched surface roughness and an unetched surface roughness differ by no more than 0.1 nm rms, measured using optical interferometry.

* * * * *